(12) United States Patent
Hu et al.

(10) Patent No.: US 12,200,366 B2
(45) Date of Patent: Jan. 14, 2025

(54) VERTICAL CORRECTION FOR PANORAMIC IMAGE

(71) Applicant: Realsee (Beijing) Technology Co., Ltd., Beijing (CN)

(72) Inventors: Yang Hu, Beijing (CN); Tong Rao, Beijing (CN); Jie Zhou, Beijing (CN); Wei Li, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 18/085,552

(22) Filed: Dec. 20, 2022

(65) Prior Publication Data
US 2023/0209205 A1 Jun. 29, 2023

(30) Foreign Application Priority Data

Dec. 27, 2021 (CN) .......................... 202111607069.7

(51) Int. Cl.
| | | |
|---|---|---|
| *H04N 23/698* | (2023.01) | |
| *G06T 3/00* | (2024.01) | |
| *G06T 3/08* | (2024.01) | |

(52) U.S. Cl.
CPC ............. *H04N 23/698* (2023.01); *G06T 3/08* (2024.01)

(58) Field of Classification Search
None
See application file for complete search history.

(56) References Cited

U.S. PATENT DOCUMENTS

| 6,246,468 B1* | 6/2001 | Dimsdale | G01B 11/002 |
| | | | 356/4.02 |
| 11,398,074 B1* | 7/2022 | Liu | G06F 18/24147 |
| 2015/0161293 A1* | 6/2015 | Will | G06F 30/00 |
| | | | 703/1 |
| 2018/0061011 A1* | 3/2018 | Kim | G06T 7/11 |
| 2022/0172318 A1* | 6/2022 | Gormer | G06T 3/08 |

* cited by examiner

*Primary Examiner* — Edemio Navas, Jr.
(74) *Attorney, Agent, or Firm* — BAYES PLLC

(57) ABSTRACT

Embodiments of the present disclosure disclose a method and device for vertical correction of a panoramic image, an electronic apparatus and a storage medium. The method includes extracting a set of straight line segments from the panoramic image, where an included angle between each straight line segment in the set of straight line segments and a current vertical direction of the panoramic image is less than a preset angle. The method further includes determining a set of target points by mapping the set of straight line segments on a unit sphere of the panoramic image. The method also includes determining an equatorial plane based on the set of target points and the center of the unit sphere and determining a vertical correction matrix based on the equatorial plane and a unit vector of the current vertical direction. The method additionally includes performing the vertical correction on the panoramic image using the vertical correction matrix.

18 Claims, 5 Drawing Sheets

VERTICAL CORRECTION FOR PANORAMIC IMAGE

CROSS-REFERENCE TO RELATED APPLICATIONS

This application is based on and claims the benefit of priority to Chinese Patent Application No. 202111607069.7, filed Dec. 27, 2021, the entire content of which is incorporated by reference.

FIELD

The present disclosure relates to image processing technology, and in particular, to a vertical correction for a panoramic image.

BACKGROUND

With continuous development of virtual reality technology, panoramic images are widely used in the fields of house leasing, hotel and homestay, home decoration and furnishing, cultural exhibitions, e-commerce retail, etc. Compared with ordinary images with a single perspective, panoramic images can provide 360-degree field of view information, so a preview of the panoramic image is more and more sought after and loved by the public.

In the fields of 3D reconstruction and VR (Virtual Reality) technology, panoramic images are increasingly used for data acquisition. Vertical correction is typically required in constructing panoramic images. For example, in the 3D reconstruction field, after vertical correction, the degrees of freedom of the rotation parameters in a pose of a panoramic image are reduced from 3 to 1, thereby making a pose calculation algorithm more robust and efficient. In the VR field, the displayed panoramic image usually needs to be vertically corrected, so that its vertical axis is aligned with a direction of gravity, which is more in line with observation habits of human eyes.

However, the existing vertical correction methods for panoramic images require to use depth information for finding a ground (horizontal plane) from depth information before performing the vertical correction, or require to manually select the horizontal direction, before using software such as Photoshop for vertical correction. These methods are complicated and time-consuming to implement.

SUMMARY

Embodiments of the present disclosure provide a vertical correction method and device for a panoramic image, an electronic apparatus and a storage medium. When performing the disclosed vertical correction on a panoramic image, there is no need to acquire a horizontal plane from depth information, an there is also no need to manually select the horizontal direction. The implementation process is simple and efficient, which facilitates improving the efficiency of making vertical correction to the panoramic image.

An aspect of embodiments of the present disclosure provides a method for vertical correction of a panoramic image. The method includes extracting a set of straight line segments from the panoramic image, where an included angle between each straight line segment in the set of straight line segments and a current vertical direction of the panoramic image is less than a preset angle. The method further includes determining a set of target points by mapping the set of straight line segments on a unit sphere of the panoramic image. The method also includes determining an equatorial plane based on the set of target points and the center of the unit sphere and determining a vertical correction matrix based on the equatorial plane and a unit vector of the current vertical direction. The method additionally includes performing the vertical correction on the panoramic image using the vertical correction matrix.

Another aspect of embodiments of the present disclosure provides a device for vertical correction of a panoramic image. The device includes a memory configured to store the panoramic image and a processor. The processor is configured to extract a set of straight line segments from the panoramic image, where an included angle between each straight line segment and a current vertical direction of the panoramic image is less than a preset angle. The processor is further configured to determine a set of target points by mapping the set of straight line segments on a unit sphere of the panoramic image and determine an equatorial plane of the unit sphere based on the set of target points and the center of the unit sphere. The processor is also configured to determine a vertical correction matrix based on the equatorial plane and a unit vector of the current vertical direction, and perform the vertical correction on the panoramic image using the vertical correction matrix.

Another aspect of embodiments of the present disclosure provides an electronic apparatus, including a memory, configured to store a computer program, and a processor, configured to execute the computer program stored in the memory, and when the computer program is executed, the processor implements a vertical correction method as summarized above.

Another aspect of embodiments of the present disclosure provides a non-transitory computer-readable storage medium having a computer program stored thereon. When the computer program is executed by a processor, it causes the processor to perform a method for vertical correction of a panoramic image. The method includes extracting a set of straight line segments from the panoramic image, where an included angle between each straight line segment in the set of straight line segments and a current vertical direction of the panoramic image is less than a preset angle. The method further includes determining a set of target points by mapping the set of straight line segments on a unit sphere of the panoramic image. The method also includes determining an equatorial plane based on the set of target points and the center of the unit sphere and determining a vertical correction matrix based on the equatorial plane and a unit vector of the current vertical direction. The method additionally includes performing the vertical correction on the panoramic image using the vertical correction matrix.

Based on the vertical correction method and device for a panoramic image, an electronic apparatus and a storage medium provided by the above-mentioned embodiments of the present disclosure, straight line segments may be first extracted from the panoramic image to be processed, so as to obtain a set of straight line segments of the panoramic image to be processed, wherein an included angle between each straight line segment in the set of straight line segments and a current vertical direction of the panoramic image to be processed is less than a preset angle. And then, a normal vector of a plane formed by projection points of each straight line segment in the set of straight line segments on a unit sphere and a center of the unit sphere is acquired, and a target point obtained by normalizing the normal vector on a spherical surface of the unit sphere is acquired, so as to obtain a set of target points. Furthermore, an equatorial plane of the unit sphere is determined based on the set of target points and the center of the unit sphere, and a vertical correction matrix based on the equatorial plane and a unit vector of the current vertical direction is determined. Finally, the vertical correction matrix is used to perform vertical correction on the panoramic image to be processed, so as to obtain a target panoramic image.

Therefore, by extracting straight line segments from the panoramic image, a set of straight line segments of the panoramic image whose included angle with the current vertical direction is smaller than the preset angle is acquired, and furthermore, the vertical correction of the panoramic image is realized based on the set of straight line segments and the unit sphere where the panoramic image is located. There is no need to acquire a horizontal plane from the depth information, and there is also no need to manually select the horizontal direction. The implementation process is simple and efficient, which facilitates improving the vertical correction efficiency of the panoramic image. In particular, for indoor scenes or outdoor scenes with buildings, a set of straight line segments whose included angle with the current vertical direction is smaller than the preset angle in the panoramic image can be quickly and accurately extracted, thereby realizing the vertical correction of the panoramic image, which can effectively improve the efficiency and accuracy of vertical correction of panoramic images.

Thereinafter, various embodiments of the present disclosure will be further described in detail through the accompanying drawings.

BRIEF DESCRIPTION OF THE DRAWINGS

The accompanying drawings, which form a part of the description, illustrate embodiments of the present disclosure and are used to explain the principles of the present disclosure together with the description.

The present disclosure may be more clearly understood from the following detailed description with reference to the accompanying drawings.

DETAILED DESCRIPTION

Figure 1:
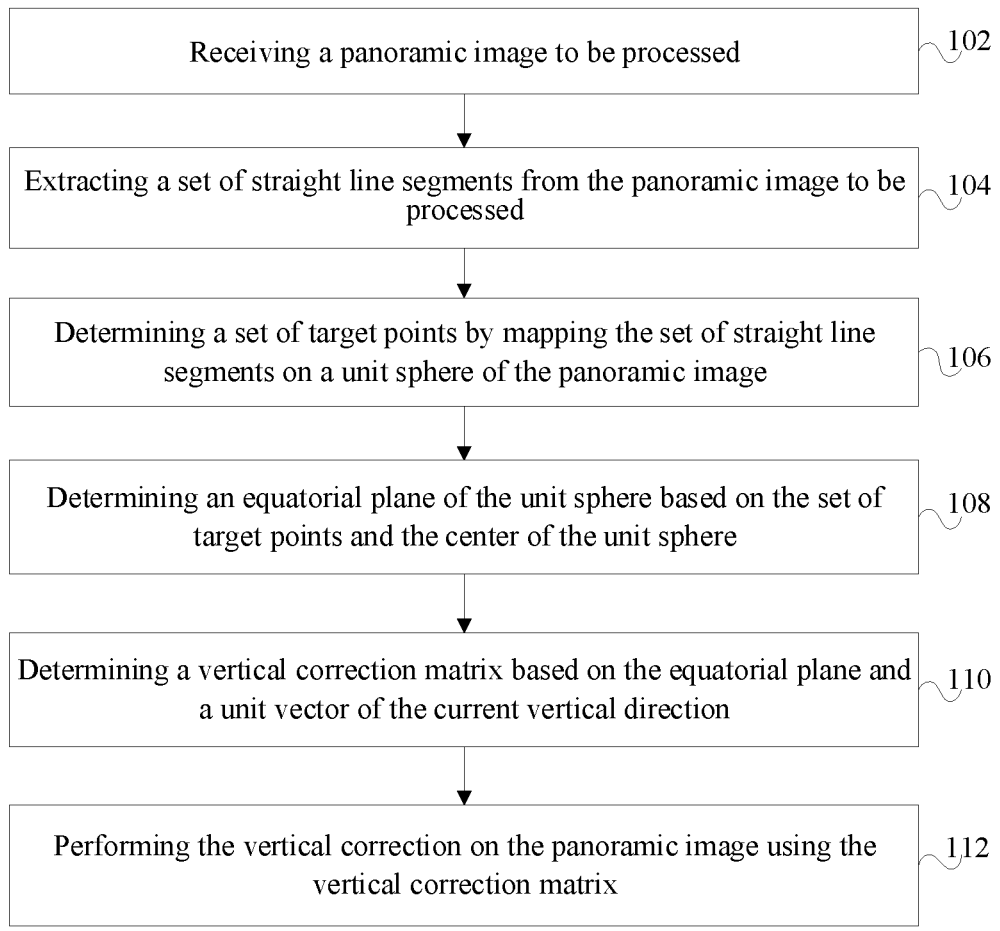
FIG. 1 is a flowchart of an embodiment of a vertical correction method for a panoramic image according to the present disclosure.

Hereinafter, various exemplary embodiments according to the present disclosure will be described in detail with reference to the accompanying drawings. It should be noted that relative arrangement of the components and steps, numerical expressions and numerical values set forth in these embodiments do not limit the scope of the present disclosure unless specifically stated otherwise.

Those skilled in the art can understand that terms such as "first" and "second" in the embodiments of the present disclosure are only used to distinguish different steps, devices, or modules, etc., and neither represent any specific technical meaning, nor represent any the necessary logical order among them.

It should also be understood that, in the embodiments of the present disclosure, "a plurality" may refer to two or more, and "at least one" may refer to one, two or more.

It should also be understood that any component, data or structure mentioned in the embodiments of the present disclosure can generally be understood as one or more in the case of no explicit definition or contrary indications given in the context.

In addition, the term "and/or" in the present disclosure is only an association relationship to describe associated objects, indicating that there can be three types of relationships, for example, A and/or B can mean the following three cases: A exists alone, A and B exist at the same time, and B exists alone. In addition, the character "/" in the present disclosure generally indicates that the related objects are an "or" relationship.

It should also be understood that the description of the various embodiments in the present disclosure emphasizes the differences among the various embodiments, and the same or similar points can be referred to each other, and for the sake of brevity, they will not be repeated.

Meanwhile, it should be understood that, for the convenience of description, the dimensions of various parts shown in the accompanying drawings are not drawn in an actual proportional relationship.

The following description of at least one exemplary embodiment is merely illustrative actually and is in no way intended to limit the present disclosure, its application or uses in any way.

Techniques, methods, and devices known to those skilled in the art may not be discussed in detail, but where appropriate, such techniques, methods, and apparatuses should be considered part of the description.

It should be noted that similar numerals and letters refer to similar items in the following figures, and thus, once a certain item is defined in one figure, it does not require further discussion in subsequent figures.

Embodiments of the present disclosure can be applied to electronic apparatuses such as terminal apparatuses, computer systems, servers, etc., which can operate with numerous other general-purpose or special-purpose computing system environments or configurations. Examples of well-known terminal apparatuses, computing systems, environments and/or configurations suitable for use with electronic apparatuses such as terminal apparatuses, computer systems, servers, etc. include, but are not limited to: personal computer systems, server computer systems, thin clients, thick clients, handheld or laptop apparatuses, microprocessor-based systems, set-top boxes, programmable consumer electronics, network personal computers, minicomputer systems, mainframe computer systems, and distributed cloud computing technology environments including any of the foregoing systems, etc.

Electronic apparatuses such as terminal apparatuses, computer systems, servers, etc., may be described in the general context of computer-system-executable instructions (such as program modules) being executed by the computer system. Generally, program modules may include routines, programs, object programs, components, logic, data structures, etc. which perform particular tasks or implement particular abstract data types. Computer systems/servers may be implemented in distributed cloud computing environments where tasks are performed by remote processing apparatuses that are linked through a communications network. In the distributed cloud computing environment, program modules may be located on a storage media of a local or remote computing system, including storage apparatuses.

FIG. 1 is a flowchart of an embodiment of a vertical correction method for a panoramic image of the present disclosure. This embodiment can be applied to an electronic apparatus.

In Step 102, a panoramic image is received.

In the embodiment of the present disclosure, the panoramic image to be processed may be a panoramic image captured for any scene, and the any scene may be an indoor scene, an outdoor scene, or a combination of an indoor scene and an outdoor scene. Embodiments of the present disclosure do not specifically limit this.

In an example, in the real estate field, the panoramic image to be processed may be a panoramic image captured for any scene in a room.

In an example, in the real estate field, the panoramic image to be processed may be a panoramic image captured for any outdoor scene with buildings.

A projection type of the panoramic image to be processed in the embodiment of the present disclosure may be any one of projection types such as cylindrical projection, equidistant cylindrical projection, equal stereoscopic projection, orthographic projection, and pinhole projection. The projection type of the panoramic image to be processed in the embodiment of the present disclosure is not limited. In the embodiment of the present disclosure, the panoramic image captured by an image capture device in real time can be acquired from the image capture device, the panoramic image stored in a preset panoramic-image gallery can also be acquired from the preset panoramic image gallery, and the panoramic image captured in real time or stored in advance may also be acquired from other electronic apparatuses connected to and communicated with the current electronic apparatus. The embodiments of the present disclosure do not limit the specific method of acquiring the panoramic image to be processed.

In Step 104, a set of straight line segments are extracted from the panoramic image.

In the embodiment of the present disclosure, any one of the straight-line-segment extracting algorithms such as LSD (Line Segment Detector) algorithm, LBD (Line Band Descriptor) algorithm can be used to extract straight line segments from the panoramic image, so as to obtain the set of straight line segments of the panoramic image to be processed, wherein the set of straight line segments includes at least two extracted straight line segments. The embodiment of the present disclosure does not specifically limit the straight-line-segment extracting algorithm used for extracting the straight line segments of the panoramic image to be processed.

In an example, an included angle between each straight line segment in the set of straight line segments and a current vertical direction of the panoramic image to be processed is less than a preset angle. It should be noted that the preset angle may be any angle not greater than 10 degrees. Those skilled in the art can set the preset angle according to actual needs. The embodiment of the present disclosure does not specifically limit the length of the preset angle. In the embodiment of the present disclosure, the current vertical direction of the panoramic image to be processed may be a Y-axis direction of the panoramic image to be processed.

In Step 106, a set of target points are determined by mapping the set of straight line segments on a unit sphere of the panoramic image.

In one embodiment, Step 106 may be implemented by acquiring respectively a normal vector of a plane formed by a projection point of each straight line segment in the set of straight line segments on a unit sphere and a center of the unit sphere, and acquiring target points obtained by normalizing the normal vector on a spherical surface of the unit sphere, so as to obtain a set of target points.

The unit sphere in the embodiment of the present disclosure is a unit sphere where the panoramic image to be processed is located, and the set of target points obtained in Step 106 may include at least two target points.

In the embodiment of the present disclosure, for each straight line segment in the set of straight line segments, two projection points of the straight line segment on the unit sphere may be determined, and the two projection points herein may be projection points of the two endpoints of the straight line segment on the unit sphere, and may also be projection points of other points on the line segment except the two endpoints on the unit sphere.

In the embodiment of the present disclosure, for different projection types of panoramic images to be processed, a projection transformation of the panoramic image to be processed from spherical surface coordinates to plane coordinates is different. Therefore, when determining the projection points of the straight line segment on the unit sphere, a projection inverse transformation of the panoramic image to be processed from plane coordinates to spherical surface coordinates may be first determined according to the projection type of the panoramic image to be processed, and then perform projection inverse transformation on the straight line segment, so as to determine the projection points of the straight line segment on the unit sphere.

In the embodiment of the present disclosure, after acquiring the projection points of each straight line segment in the set of straight line segments on the unit sphere, for each straight line segment, a normal vector of the plane formed by the two projection points of the straight line segment and the center of the unit sphere is determined, the normal vector is normalized, and the points on the spherical surface of the unit sphere corresponding to the normalized normal vector are used as target points of each straight line segment, and furthermore, a set of target points can be obtained based on target points of each straight line segment in the set of straight line segments.

In Step 108, an equatorial plane of the unit sphere is determined based on the set of target points and the center of the unit sphere.

In the embodiment of the present disclosure, by performing plane fitting on the target points in the set of target points and the center of the unit sphere, a plurality of fitting planes passing through the center of the unit sphere can be obtained, and furthermore, the equatorial plane can be selected from the plurality of fitting planes, and a normal vector of the equatorial plane is the vertical direction.

In Step 110, a vertical correction matrix is determined based on the equatorial plane and a unit vector of the current vertical direction of the panoramic image to be processed.

In the embodiment of the present disclosure, the normal vector of the equatorial plane obtained in Step 108 may be first determined, and then a rotation matrix for rotating the unit vector of the current vertical direction of the panoramic image to be processed into the normal vector of the equatorial plane is determined, and furthermore, the rotation matrix is used as the vertical correction matrix used for vertical correction of the panoramic image to be processed.

In Step 112, vertical correction is performed on the panoramic image using the vertical correction matrix, obtaining a target panoramic image.

In the embodiment of the present disclosure, the vertical correction matrix determined in Step 110 may be used to perform vertical correction pixel by pixel on the panoramic image to be processed in order to obtain the target panoramic image.

For example, in some embodiments, the panoramic image to be processed can be vertically corrected pixel by pixel by using the following formula so as to obtain the target panoramic image:

$$[x\ y\ 1]=[x_0\ y_0\ 1]M_{3*3} \quad (1)$$

Therein, $(x_0, y_0)$ is a coordinate value of a pixel in the panoramic image to be processed before vertical correction, $(x, y)$ is a coordinate value of a pixel in the panoramic image to be processed after vertical correction, and $M_{3*3}$ is a vertical correction matrix with three rows and three columns.

Based on the method provided by the above-mentioned embodiment of the present disclosure, straight line segments may be first extracted from the panoramic image to be processed, so as to obtain a set of straight line segments of the panoramic image to be processed, wherein an included angle between each straight line segment in the set of straight line segments and a current vertical direction of the panoramic image to be processed is less than a preset angle. And then, a normal vector of a plane formed by projection points of each straight line segment in the set of straight line segments on a unit sphere and a center of the unit sphere may be acquired, and target points obtained by normalizing the normal vector on a spherical surface of the unit sphere are acquired, so as to obtain a set of target points. Furthermore, an equatorial plane of the unit sphere may be determined based on the set of target points and the center of the unit sphere, and a vertical correction matrix is determined based on the equatorial plane and a unit vector of the current vertical direction of the panoramic image to be processed. Finally, the vertical correction matrix are used to perform vertical correction on the panoramic image to be processed, so as to obtain a target panoramic image. Therefore, by extracting straight line segments from the panoramic image, a set of straight line segments of the panoramic image whose included angle with the current vertical direction is smaller than the preset angle may be acquired, and furthermore, the vertical correction of the panoramic image may be realized based on the set of straight line segments and the unit sphere where the panoramic image is located. There is no need to acquire a horizontal plane from depth information, and there is also no need to manually select the horizontal direction. The implementation process of the method is simple and efficient, which facilitates improving the vertical correction efficiency of the panoramic image. In particular, for indoor scenes or outdoor scenes with buildings, a set of straight line segments whose included angle with the current vertical direction is smaller than the preset angle in the panoramic image can be quickly and accurately extracted, thereby realizing the vertical correction of the panoramic image, which can effectively improve the efficiency and accuracy of vertical correction of panoramic images.

Optionally, in some embodiments of the present disclosure, in the above Step 104, when extracting the straight line segments to obtain the set of straight line segments of the panoramic image to be processed, pinhole projection may be performed on the panoramic image to be processed, so as to acquire a plurality of pinhole images; and then straight line segments are respectively extracted from each pinhole image in the plurality of pinhole images, so as to acquire a subset of straight line segments of the pinhole image; and furthermore, the set of straight line segments of the panoramic images to be processed is obtained based on the subset of straight line segments of the pinhole images.

In the embodiment of the present disclosure, first, according to the projection type of the panoramic image to be processed, the projection inverse transformation of the panoramic image to be processed from plane coordinates to spherical surface coordinates may be determined, and then the projection inverse transformation may be used to inversely transform the panoramic image to be processed from the plane coordinates to the spherical surface coordinates. Afterwards, pinhole projection (also known as linear projection or azimuth projection) is performed on the panoramic image to be processed in the spherical surface coordinates so as to obtain multiple pinhole images. Furthermore, straight line segments can be extracted respectively from each pinhole image in the plurality of pinhole images, so as to acquire subsets of straight line segments of the pinhole images. Since the included angle between each straight line segment in the subsets of straight line segments and the current vertical direction of the panoramic image to be processed is smaller than the preset angle, the subsets of straight line segments of the plurality of pinhole images can be combined so as to obtain the set of straight line segments of the panoramic image to be processed.

In the embodiment of the present disclosure, any one of the straight-line-segment extracting algorithms such as LSD (Line Segment Detector) algorithm, LBD (Line Band Descriptor) algorithm can be used to extract straight line segments from the pinhole image, so as to obtain the subset of straight line segments of the pinhole image, and then, the subsets of straight line segments of the plurality of pinhole images can be combined, so as to obtain the set of straight line segments of the panoramic image to be processed, wherein the set of straight line segments includes at least two extracted straight line segments. The embodiment of the present disclosure does not specifically limit the straight-line-segment extracting algorithm used for extracting the straight line segments of the pinhole image.

In some applications, by comparing different projection types of panoramic images, it can be found that in some projection types of panoramic images, the straight lines in the real scene are deformed into curves. If straight line segments are directly extracted from these projection types of the panoramic images, extraction is difficult and accuracy is low. However, in the pinhole projection type of the panoramic image, the straight lines in the real scene can be kept straight, and the extraction of straight line segments is less difficult and more accurate. Therefore, the projection inverse transformation can be used to map the panoramic image to be processed to spherical surface coordinates, and further pinhole projection can be used to map the panoramic image to be processed in spherical coordinates into a plurality of pinhole images, and then extraction of straight line segments is respectively performed for each pinhole image of the plurality of pinhole images, so as to acquire a subset of straight line segments of the pinhole image, and furthermore, the set of straight line segments of the panoramic image to be processed is obtained, which can effectively reduce the difficulty of extracting straight line segments, improve the accuracy of extracting straight line segments, and thus improve the efficiency and accuracy of vertical correction of the panoramic image.

Optionally, in some embodiments of the present disclosure, in the above Step 106, when determining a set of target points by mapping the set of straight line segments on a unit sphere of the panoramic image, two endpoints of the each straight line segment may be projected to the unit sphere, to form a first projection point and a second projection point of the each straight line segment; and then a normal vector of a plane formed by the center of the unit sphere, and the first projection point and the second projection point of the each straight line segment may be determined; and then the normal vector of the plane may be normalized, so as to obtain the normalized normal vector, and a point corresponding to the normalized normal vector on the spherical surface of the unit sphere may be used as the target point of the each straight line segment; and furthermore the set of target points is obtained based on the target point of each straight line segment.

In one implementation, the projection points of the straight line segment may be the first projection point and the second projection point obtained by projecting the two endpoints of the straight line segment onto the unit sphere.

In one implementation, the set of target points for determining the equatorial plane of the unit sphere may be obtained based on the first projection point and the second projection point of each straight line segment in the set of straight line segments, and the spherical center of the unit sphere. As for the set of target points, the influence of each straight line segment in the set of straight line segments on the determination result of the equatorial plane is comprehensively considered, which facilitates improving the accuracy of the determination result of the equatorial plane, thereby improving the accuracy of the vertical correction matrix and improving the vertical correction effect of the panoramic image.

Optionally, in some embodiments of the present disclosure, in the above Step 108, when determining the equatorial plane of the unit sphere based on the set of target points and the center of the unit sphere, according to a preset manner, two target points may be selected from the set of target points for many times; and then, for the two target points selected each time, the following operation may be performed respectively: constructing a reference plane based on the two target points and the center of the unit sphere; acquiring distances from other target points in the set of target points except the two target points to the reference plane; and determining the number of other target points whose distances from themself to the reference plane are less than a first preset threshold. Furthermore, in multiple reference planes corresponding to two target points selected for multiple times, the reference plane with the largest number of the other target points is determined as the equatorial plane.

In one implementation, at least one of the two target points selected for any two times is different.

In one implementation, the first preset threshold may be any length not greater than 10 arc lengths, and those skilled in the art may set the first preset threshold according to actual needs. The length of the preset threshold is not specifically limited in the embodiments of the present disclosure.

In an example, according to the preset manner, selecting two target points from the set of target points for multiple times may be to randomly select two target points from the set of target points for multiple times, or may be to select two target points from the set of target points according to an order of the target points in the set of target points for multiple times.

In an example, before selecting, according to the preset manner, two target points from the set of target points for multiple times, the method may include sorting the set of target points according to a preset rule to obtain a sorted set of target points, and then according to the preset manner, selecting two target points from the set of target points for multiple times.

In an example, the step of sorting the set of target points according to a preset rule may include: sorting the set of target points according to a length of the distance from each target point in the set of target points to the center of the unit sphere.

Based on one implementation, two target points may be selected from the set of target points for multiple times according to the preset manner, and in the multiple reference planes corresponding to the target points selected for multiple times, and the reference plane with the largest number of the other target points may be determined as the equatorial plane. Thus, the most suitable reference plane can be selected from multiple reference planes as the equatorial plane, which facilitates improving the accuracy of the determination result of the equatorial plane, thereby improving the accuracy of the vertical correction matrix and improving the vertical correction effect of the panoramic image.

Or, in some other embodiments of the present disclosure, in the above Step 108, when determining the equatorial plane of the unit sphere based on the set of target points and the center of the unit sphere, according to the preset manner, two target points may be selected from the set of target points, and then a reference plane may be constructed based on the two target points and the center of the unit sphere, the distances from other target points in the set of target points except the two target points to the reference plane may be acquired, and the number of other target points whose distances from themself to the reference plane are less than the first preset threshold may be determined, and then it is determined whether the number of the other target points is greater than a second preset threshold; if the number of the other target points is greater than the second preset threshold, the reference plane is determined as the equatorial plane, and if the number of the other target points is not greater than the second preset threshold, the operation of selecting, according to the preset manner, two target points from the set of target points is performed, so as to select two new target points, wherein the two new target points are different from at least one of the two target points, and the two new target points are used as the two target points to perform the operation of constructing the reference plane based on the two target points and the center of the unit sphere.

In one implementation, the first preset threshold may be any length not greater than 10 arc lengths, and the second threshold may be set according to the number of other target points, for example, it may be 70% of the number of other target points, or 80% of the number of other target points, etc. Those skilled in the art can set the first preset threshold and the second preset threshold according to actual needs, which are not specifically limited in the embodiments of the present disclosure.

In an example, according to a preset manner, selecting two target points from the set of target points may be to randomly select two target points from the set of target points, or may be to select two target points from the set of target points according to an order of the target points in the set of target points.

In an example, before selecting, according to the preset manner, two target points from the set of target points, the method may include sorting the set of target points according to a preset rule so as to obtain a sorted set of target points, and then according to the preset manner, selecting two target points from the set of target points.

In an example, the step of sorting the set of target points according to a preset rule may include: sorting the set of target points according to a length of the distance from each target point in the set of target points to the center of the unit sphere.

Based on one implementation, for the reference planes corresponding to two currently selected target points, if the number of other target points is greater than the second preset threshold, the reference plane can be determined as the equatorial plane, and there is no need to select two new target points from the set of target points, and there is also no need to perform the operation of constructing a reference plane and the operation of determining the number of other target points for the two new target points, which facilitates saving computing resources and improving computing efficiency, thereby improving the vertical correction efficiency of the panoramic image.

Optionally, in some embodiments of the present disclosure, in the above Step 108, before the step of acquiring distances from other target points in the set of target points except the two target points to the reference plane, an included angle between the normal vector of the reference plane and the unit vector of the current vertical direction of the panoramic image to be processed may be determined; and then it is determined whether the included angle is less than a third preset threshold; and if the included angle is smaller than the third preset threshold, the operation of acquiring distances from other target points in the set of target points except the two target points to the reference plane is performed.

In one implementation, those skilled in the art can set the third preset threshold according to actual needs, for example, the third preset threshold can be set as 5 degrees, 10 degrees, 20 degrees, 30 degrees, etc., the length of the third preset threshold is not limited in the embodiment of the present disclosure.

In an example, if the included angle is not less than the third preset threshold, an operation of selecting two target points from the set of target points according to a preset manner may be performed, so as to select two new target points, and the two new target points are used as two target points, and the operation of constructing a reference plane based on the two target points and the center of the unit sphere is performed, and the two new target points are different from at least one of the above-mentioned two target points.

In an example, if the included angle is not less than the third preset threshold, the operation of constructing a reference plane based on the two target points and the center of the unit sphere may also be respectively performed for the two target points selected for other times.

In practical applications, when capturing a panoramic image, a skew angle of a camera generally does not exceed 30 degrees. If the skew angle of the normal vector of the current reference plane (the degree of the included angle between the normal vector of the current reference plane and the unit vector of the current vertical direction of the panoramic image to be processed) exceeds 30 degrees, it may be determined that the reference plane is not the equatorial plane. Based on one implementation, if the included angle between the normal vector of the reference plane and the unit vector of the current vertical direction of the panoramic image to be processed is smaller than the third preset threshold, the operation of determining the number of other target points of the reference plane may be performed, and if the included angle between the normal vector of the reference plane and the unit vector of the current vertical direction of the panoramic image to be processed is not less than the third preset threshold, the operation of determining the number of other target points of the reference plane need not be performed, which facilitates saving computing resources and improving computing efficiency, and thereby improving the vertical correction efficiency of panoramic images.

Figure 2:
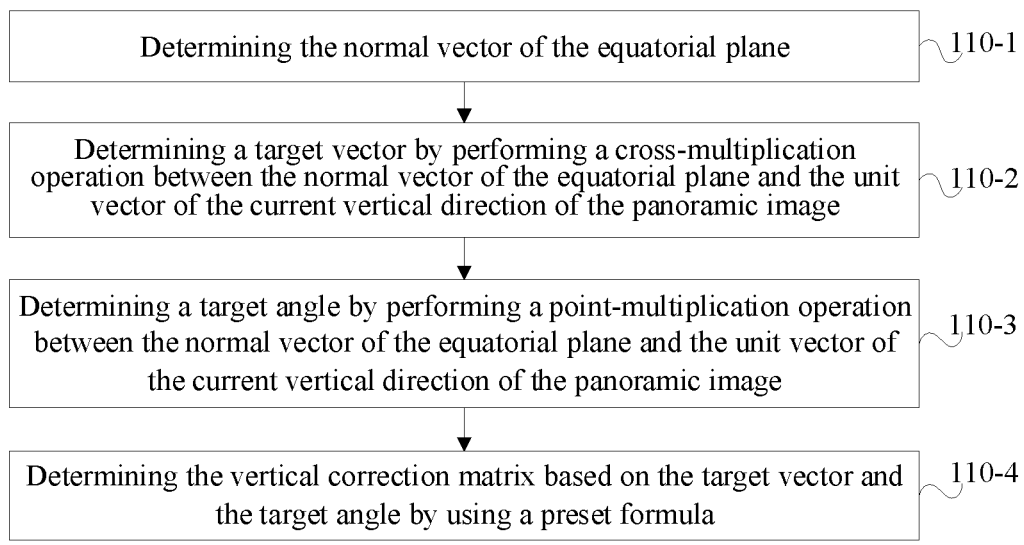
FIG. 2 is a flowchart of another embodiment of a vertical correction method for a panoramic image according to the present disclosure.

FIG. 2 is a flowchart of another embodiment of a vertical correction method for a panoramic image of the present disclosure. The method shown in FIG. 2 may be performed to implement Step 110 of the embodiment shown in FIG. 1.

In Step 110-1, the normal vector of the equatorial plane may be determined.

In Step 110-2, a target vector may be determined by performing a cross-multiplication operation between the normal vector of the equatorial plane and the unit vector of the current vertical direction of the panoramic image to be processed.

In Step 110-3, a target angle may be determined by performing a point-multiplication operation between the normal vector of the equatorial plane and the unit vector of the current vertical direction of the panoramic image to be processed.

In Step 110-4, the vertical correction matrix may be determined based on the target vector and the target angle, e.g., by using a preset formula.

In the embodiment of the present disclosure, the preset formula may be an angular axis formula. The angle axis formula may be:

$$M(\hat{v}, \theta) = \begin{bmatrix} \cos\theta + (1-\cos\theta)x^2 & (1-\cos\theta)xy - (\sin\theta)z & (1-\cos\theta)xz + (\sin\theta)y \\ (1-\cos\theta)yx + (\sin\theta)z & \cos\theta + (1-\cos\theta)y^2 & (1-\cos\theta)yz - (\sin\theta)x \\ (1-\cos\theta)zx - (\sin\theta)y & (1-\cos\theta)zy + (\sin\theta)x & \cos\theta + (1-\cos\theta)z^2 \end{bmatrix} \quad (2)$$

Therein, $M(\hat{v}, \theta)$ is a rotation matrix, $\theta$ is a rotation angle, and $\hat{v}(x, y, z)$ is a unit vector of the direction vector of the rotation axis.

In one embodiment of the present disclosure, the vertical correction matrix may be determined by using the target vector as the rotation axis and determining the unit vector of the target vector, using the target angle as the rotation angle, and then using the above angle axis formula to determine the rotation matrix as the vertical correction matrix.

Based on the embodiments of the present disclosure, after the equatorial plane is determined, a vertical correction matrix can be determined based on the normal vector of the equatorial plane and the unit vector of the current vertical direction of the panoramic image to be processed, and then the vertical correction of the panoramic image to be processed can be realized based on the vertical correction matrix. There is no need to acquire the horizontal plane from depth information, and there is also no need to manually select the horizontal direction. The implementation process is simple and fast, which facilitates improving the vertical correction efficiency of the panoramic image.

Figure 3:
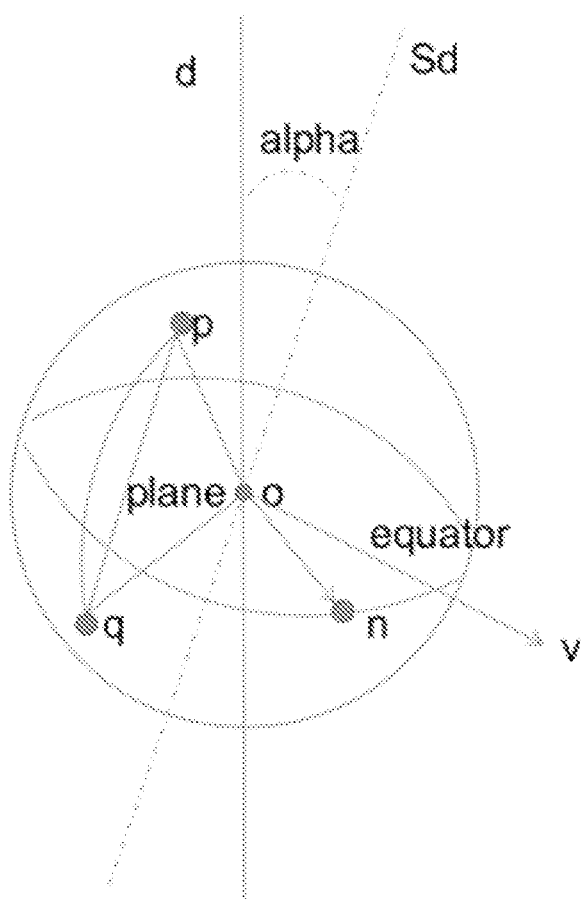
FIG. 3 is a schematic diagram of a specific application of the vertical correction method for a panoramic image according to the present disclosure.

FIG. 3 is a schematic diagram of a specific application of the vertical correction method for a panoramic image of the present disclosure. As shown in FIG. 3, an arc pq is an arc formed by mapping one straight line segment in the panoramic image to be processed onto the unit sphere, the projection points are p and q, o is the center of the unit sphere, and opq determines a plane plane whose unit normal vector is n. If the straight line segment in the panoramic image to be processed corresponding to p, q is an image of a vertical line segment in real space, the normal vector n is just on the equatorial plane equator of the unit sphere. The equatorial plane equator can be solved by the RANSAC (Random Sample Consensus) algorithm, and the normal vector Sd of the equatorial plane can be used as corrected vertical direction. In FIG. 3, d is the current vertical direction of the panoramic image to be processed, and whose included angle with Sd is alpha. Two vectors d and alpha are cross-multiplied to obtain a vector v Sd can coincide with d by rotating Sd alpha degrees around v. According to the angle axis formula, a rotation matrix used for rotating Sd around v is obtained, and the rotation matrix can be used as the vertical correction matrix of the panoramic image to be processed.

Hereinafter, in conjunction with FIG. 3, the vertical correction method for the panoramic image according to the present disclosure will be further described.

In Step a, a set of straight line segments of the panoramic image are extracted. In Step a, straight line segments may be directly extracted from the panoramic image to be processed, or pinhole projection may be performed on the panoramic image to be processed, and then straight line segments may be extracted from multiple pinhole images, so as to obtain a set of straight line segments of the panoramic image to be processed. This process can use any one of straight-line-segment extracting algorithms, such as LSD algorithm and LBD algorithm.

In Step b, a set of target points are determined. In this Step b, the two endpoints of each straight line segment extracted in Step a can be projected onto the unit sphere so as to obtain two projection points (p, q) on the unit sphere. These two projection points p, q and the center o of the unit sphere forms a plane (plane), and the normal vector n of this plane is figured out and normalized to obtain a target point on the sphere. The set of target points of all planes constitutes the set Sn of target points. For each straight line segment extracted in Step a, if the straight line segment is a vertical line segment, the normal vector of the plane formed by the two projection points of the straight line segment and the center of the sphere is on the equatorial plane equator of the unit sphere.

In Step c, an equatorial plane is determined. In this Step c, two target points may be randomly selected from the set Sn of target points to form a reference plane with the center of the sphere. The distances from other target points in the set of target points except the two target points to the reference plane are determined, and the number of other target points in the set Sn of target points whose distances to the reference plane are smaller than the first preset threshold. The above process is repeated for several times to obtain the reference plane with the largest number of other target points as the equatorial plane equator.

In Step d, the vertical correction matrix is determined, and vertical correction is performed on the panoramic image. In this Step d, the direction of normal vector of the equatorial plane equator obtained in the above Step c is parallel to the north-south direction (that is, the vertical direction), and the normal vector is calculated to obtain the normal vector Sd. The unit vector of the current vertical direction of the panoramic image to be processed is denoted as d. Sd and d are cross-multiplied to obtain the vector v, Sd and d are point-multiplied to obtain the rotation angle alpha, and then by using a preset formula, a rotation matrix used for rotating the normal vector Sd around v by alpha may be determined. This rotation matrix is served as the vertical correction matrix of the panoramic image to be processed, and furthermore, the vertical correction matrix can be used to perform vertical correction pixel by pixel for the panoramic image to be processed.

Any one of vertical correction methods for a panoramic image provided by the embodiments of the present disclosure may be executed by any appropriate apparatus with data processing capabilities, comprising but not limited to: a terminal apparatus, a server, and the like. Or, any one of vertical correction methods for a panoramic image provided by the embodiments of the present disclosure may be executed by a processor, for example, a processor executes any one of vertical correction methods for a panoramic image mentioned in the embodiments of the present disclosure by invoking corresponding instructions stored in a memory. Further description will not be given hereinafter.

Those skilled in the art can understand that all or part of the steps of implementing the above method embodiments can be completed by hardware related to program instructions, the above-mentioned program can be stored in a computer-readable storage medium, and when the program is executed, the steps of the above method embodiments are executed. And the above-mentioned storage medium includes: ROM, RAM, magnetic disk or optical disk and other media that can store program codes.

Figure 4:
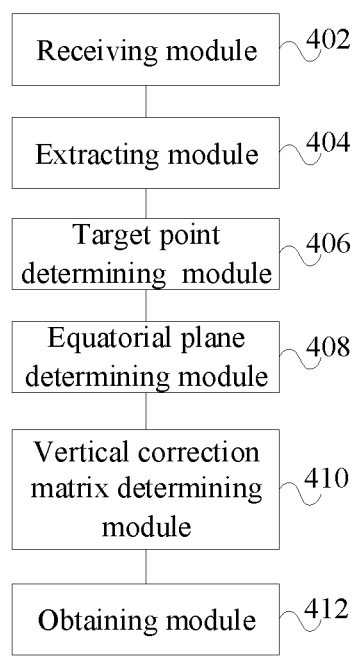
FIG. 4 is a schematic structure diagram of an embodiment of a vertical correction device for a panoramic image according to the present disclosure.

FIG. 4 is a schematic structure diagram of an embodiment of a vertical correction device for a panoramic image according to the present disclosure. The vertical correction device for a panoramic image in the embodiment can be used to implement the above-mentioned embodiments of the vertical correction method for each panoramic image according to the present disclosure. As shown in FIG. 4, the device of this embodiment comprises: a receiving module 402, an extracting module 404, a target point determining module 406, an equatorial plane determining module 408, a vertical correction matrix determining module 410 and a vertical correction module 412.

The receiving module 402 is configured to receive a panoramic image to be processed. The extracting module 404 is configured to extract a set of straight line segments from the panoramic image to be processed. The set of straight line segments includes at least two extracted straight line segments, and an included angle between the straight line segment and a current vertical direction of the panoramic image to be processed is less than a preset angle.

The target points determining module 406 is configured to determine a set of target points by mapping the set of straight line segments on a unit sphere of the panoramic image. In some embodiments, the target points determining module 406 is configured to acquire respectively a normal vector of a plane formed by projection points of each straight line segment in the set of straight line segments on a unit sphere and a center of the unit sphere, and acquire a target point obtained by normalizing the normal vector on a spherical surface of the unit sphere, so as to obtain a set of target points, wherein the set of target points includes at least two target points, and the unit sphere is a unit sphere where the panoramic image to be processed is located.

The equatorial plane determining module 408 is configured to determine an equatorial plane of the unit sphere based on the set of target points and the center of the unit sphere.

The vertical correction matrix determining module 410 is configured to determine a vertical correction matrix based on the equatorial plane and a unit vector of the current vertical direction.

The vertical correction module 412 is configured to perform vertical correction on the panoramic image to be processed using the vertical correction matrix, thus obtaining a target panoramic image.

Based on the vertical correction device for a panoramic image provided by the embodiment of the present disclosure, by extracting straight line segments from the panoramic image, a set of straight line segments of the panoramic image whose included angle with the current vertical direction is smaller than the preset angle may be acquired, and furthermore, the vertical correction of the panoramic image may be realized based on the set of straight line segments and the unit sphere where the panoramic image is located. There is no need to acquire a horizontal plane from the depth information, and there is also no need to manually select the horizontal direction. The implementation process is simple and efficient, which facilitates improving the vertical correction efficiency of the panoramic image. In particular, for indoor scenes or outdoor scenes with buildings, a set of straight line segments whose included angle with the current vertical direction is smaller than the preset angle in the panoramic image can be quickly and accurately extracted, thereby realizing the vertical correction of the panoramic image, which can effectively improve the efficiency and accuracy of vertical correction of panoramic images.

Figure 5:
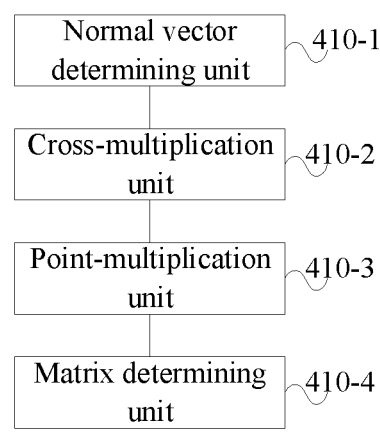
FIG. 5 is a schematic structure diagram of another embodiment of a vertical correction device for a panoramic view according to the present disclosure.

FIG. 5 is a schematic structure diagram of another embodiment of a vertical correction device for a panoramic view according to the present disclosure. As shown in FIG. 5, the vertical correction matrix determining module 410 may comprise a normal vector determining unit 410-1, a cross-multiplication unit 410-2, a point-multiplication unit 410-3 and a matrix determining unit 410-4.

The normal vector determining unit 410-1 is configured to determine the normal vector of the equatorial plane. The cross-multiplication unit 410-2 is configured to determine a target vector by performing a cross-multiplication operation between the normal vector of the equatorial plane and the unit vector of the current vertical direction of the panoramic image to be processed. The point-multiplication unit 410-3 is configured to determine a target angle by performing a point-multiplication operation between the normal vector of the equatorial plane and the unit vector of the current vertical direction of the panoramic image to be processed. The matrix determining unit 410-4 is configured to determine a vertical correction matrix based on the target vector and the target angle by using a preset formula.

In addition, an embodiment of the present disclosure further provides an electronic apparatus, including a memory, configured to store a computer program, and a processor, configured to execute the computer program stored in the memory, and when the computer program is executed, implement the vertical correction method for a panoramic image in any one of the above-mentioned embodiments of the present disclosure.

Figure 6:
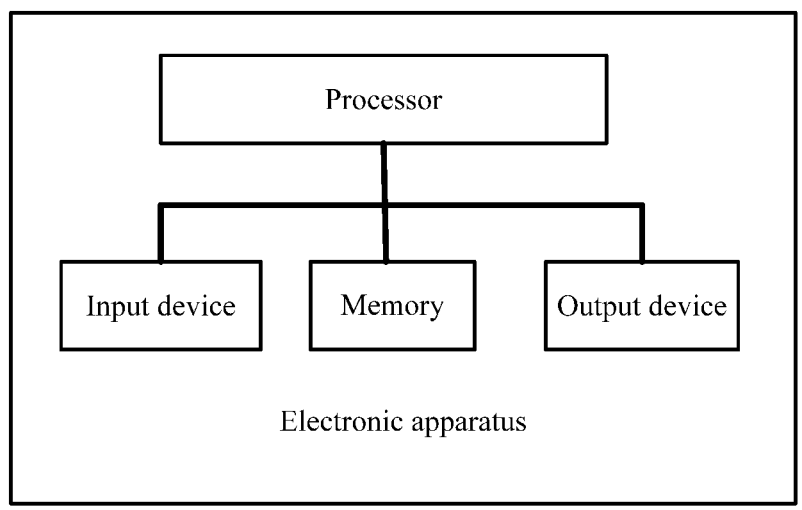
FIG. 6 is a schematic structure diagram of an application embodiment of an electronic apparatus according to the present disclosure.

FIG. 6 is a schematic structure diagram of an application embodiment of an electronic apparatus according to the present disclosure. Hereinafter, with reference to FIG. 6, an electronic apparatus according to an embodiment of the present disclosure is described. The electronic apparatus may be either or both of the first apparatus and the second apparatus, or a stand-alone apparatus independent of them that can communicate with the first apparatus and the second apparatus so as to receive collected input signals from them.

As shown in FIG. 6, the electronic apparatus includes one or more processors and a memory.

The processor may be a central processing unit (CPU) or other form of processing unit having data processing capabilities and/or instruction execution capabilities, and may control other components in the electronic apparatus so as to perform desired functions.

The memory may include one or more computer program products, which may include various forms of computer-readable storage media, such as volatile memory and/or non-volatile memory. The volatile memory may include, for example, random access memory (RAM) and/or cache. The non-volatile memory may include, for example, a read only memory (ROM), a hard disk, a flash memory, and the like. One or more computer program instructions may be stored on the computer-readable storage medium, and the processor may execute the program instructions so as to implement the vertical correction method for a panoramic image of the various embodiments according to the present disclosure described above and/or or other desired functions.

In one example, the electronic apparatus may further comprise an input device and an output device, which are interconnected by a bus system and/or other form of connection mechanism (not shown).

In addition, the input device may further comprise, for example, a keyboard, a mouse, and the like.

The output device can output various information to the outside, including determined distance information, direction information, and the like. The output device may include, for example, a display, a speaker, a printer, a communication network and a remote output device connected thereto, and the like.

Obviously, for simplicity, only some of the components in the electronic apparatus related to the present disclosure are shown in FIG. 6, and components such as buses, input/output interfaces, and the like are omitted. In addition, the electronic apparatus may further include any other appropriate components depending on the specific application.

In addition to the methods and apparatuses described above, embodiments of the present disclosure may further be a computer program product, comprising computer program instructions. When the computer program instructions are executed by a processor, the processor performs steps in the vertical correction method for a panoramic image in various embodiments of the present disclosure described in the above part of this description.

The computer program product may write program code for performing operations of embodiments of the present disclosure in any combination of one or more programming languages, and these programming languages include object-oriented programming languages, such as Java, C++, etc., further includes conventional procedural programming languages, such as "C" language or similar programming languages. The program code may execute entirely on the user computing apparatus, partly on the user device, as a stand-alone software package, partly on the user computing apparatus and partly on a remote computing apparatus, entirely on the remote computing apparatus, or server.

In addition, embodiments of the present disclosure may further be a computer-readable storage medium having computer program instructions stored thereon. When the computer program instructions are executed by a processor, the processor performs steps in in the vertical correction method for a panoramic image in various embodiments of the present disclosure described in the above part of this description.

The computer-readable storage medium may adopt any combination of one or more readable media. The readable medium may be a readable signal medium or a readable storage medium. The readable storage medium may include, for example, but not limited to, electrical, magnetic, optical, electromagnetic, infrared, or semiconductor systems, devices or equipment, or any combination of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any above-mentioned suitable combination.

The basic principles of the present disclosure have been described above in connection with specific embodiments. However, it should be pointed out that the specific implementations disclosed in the present disclosure are only examples rather than limitations. Also, the advantages, superiorities, effects, etc. disclosed should not be considered as must-have for each embodiment of the present disclosure. In addition, the specific details disclosed above are only for the purpose of example and easy understanding, but not for limitation, and the above details do not limit the present disclosure to be implemented by using the above specific details.

The various embodiments in this description are described in a progressive manner, and each embodiment focuses on the differences from other embodiments, and the same or similar parts between the various embodiments may be referred to each other. As for embodiments of the system, since it basically corresponds to the method embodiment, the description is relatively simple, and for related parts, reference is made to the partial description of embodiments of the method.

The block diagrams of equipment, devices, apparatuses, and systems referred to in the present disclosure are merely illustrative examples and are not intended to require or imply that the connections, arrangements, or configurations must be in the manner shown in the block diagrams. As those skilled in the art will appreciate, these equipment, devices, apparatuses, and systems may be connected, arranged, configured in any manner. Words such as "including", "comprising", "having" and the like are open-ended words, which mean "including but not limited to" and are used interchangeably therewith. As used herein, the words "or" and "and" refer to and are used interchangeably with the word "and/or", unless the context clearly dictates otherwise. As used herein, the word "such as" refers to and is used interchangeably with the phrase "such as but not limited to".

The methods and devices of the present disclosure may be implemented in many ways. For example, the methods and devices of the present disclosure may be implemented in software, hardware, firmware, or any combination of software, hardware, and firmware. The above-described order of steps for the method is for illustration only, and the steps of the method of the present disclosure are not limited to the order specifically described above, unless specifically stated otherwise. Furthermore, in some embodiments, the present disclosure can further be implemented as programs recorded in a recording medium, the programs include machine-readable instructions for implementing methods according to the present disclosure. Thus, the present disclosure further covers a recording medium storing a program for executing the method according to the present disclosure.

It should further be pointed out that, in the device, apparatus and method of the present disclosure, each component or each step may be decomposed and/or recombined. The decomposition and/or recombination should be considered equivalents of the present disclosure.

The above description of the disclosed aspects is provided to enable those skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

The foregoing description has been presented for the purposes of illustration and description. Furthermore, this description is not intended to limit embodiments of the present disclosure to the forms disclosed herein. Although a number of example aspects and embodiments have been discussed above, those skilled in the art will recognize certain variations, modifications, changes, additions and sub-combinations thereof

What is claimed is:

1. A method for vertical correction of a panoramic image, comprising:
    extracting, by a processor, a set of straight line segments from the panoramic image, wherein an included angle between each straight line segment and a current vertical direction of the panoramic image is less than a preset angle;
    determining, by the processor, a set of target points by mapping the set of straight line segments on a unit sphere of the panoramic image;
    determining, by the processor, an equatorial plane of the unit sphere based on the set of target points and a center of the unit sphere, comprising:
        constructing a first plane based on a pair of target points in the set of target points and the center of the unit sphere; and
        determining the equatorial plane of the unit sphere based on the first plane and a number threshold, the number threshold being compared with a number of target points in the set of target points, and the target points in the set of target points meeting a preset condition associated with the pair of target points corresponding to the first plane;
    determining, by the processor, a vertical correction matrix based on the equatorial plane and a unit vector of the current vertical direction; and
    performing, by the processor, the vertical correction on the panoramic image using the vertical correction matrix.

2. The method according to claim 1, wherein extracting the set of straight line segments from the panoramic image further comprises:
    performing pinhole projection on the panoramic image to obtain a plurality of pinhole images; and
    extracting a subset of straight line segments from each pinhole image in the plurality of pinhole images, wherein the subsets of straight line segments for the plurality of pinhole images collectively form the set of straight line segments of the panoramic image.

3. The method according to claim 1, wherein determining the set of target points by mapping the set of straight line segments on the unit sphere of the panoramic image further comprises:
  projecting two endpoints of each straight line segment of the set of straight line segments to form a first projection point and a second projection point on the unit sphere;
  determining a normal vector of a plane formed by the center of the unit sphere, and the first projection point, and the second projection point of the straight line segment, the plane comprising the first plane;
  normalizing the normal vector of the plane to intersect with a spherical surface of the unit sphere; and
  obtaining the set of target points based on the normalized normal vector and the target point of each straight line segment.

4. The method according to claim 1, wherein determining the equatorial plane of the unit sphere based on the set of target points and the center of the unit sphere further comprises:
  selecting, according to a preset manner, a plurality of pairs of target points from the set of target points, each pair comprising two target points, wherein any two pairs differ in at least one target point, the plurality of pairs of target points as selected comprising the pair of target points;
  for each pair of target points of the plurality of pairs of target points as selected, constructing a reference plane based on the two target points and the center of the unit sphere, and determining a number of target points in the set of target points other than the two target points that are at distances less than a first preset threshold from the reference plane, the reference plane comprising the first plane; and
  determining, among the reference planes corresponding to the plurality of pairs of target points, the reference plane with a largest number of target points as the equatorial plane.

5. The method according to claim 1, wherein determining the equatorial plane of the unit sphere based on the set of target points and the center of the unit sphere further comprises:
  selecting, according to a preset manner, two target points from the set of target points, the two target points as selected being the pair of target points;
  constructing a reference plane based on the two target points and the center of the unit sphere, the reference plane being the first plane;
  determining a number of target points in the set of target points other than the two target points that are at distances less than a first preset threshold from the reference plane; and
  determining the reference plane as the equatorial plane when the number is greater than a second preset threshold.

6. The method according to claim 4, wherein determining the number of target points in the set of target points other than the two target points that are at distances less than the first preset threshold from the reference plane further comprises:
  determining an included angle between a normal vector of the reference plane and the unit vector of the current vertical direction of the panoramic image; and
  when the included angle is smaller than a third preset threshold, determining the number of target points in the set of target points other than the two target points that are at distances less than the first preset threshold from the reference plane.

7. The method according to claim 5, wherein determining the number of target points in the set of target points other than the two target points that are at distances less than the first preset threshold from the reference plane further comprises:
  determining an included angle between a normal vector of the reference plane and the unit vector of the current vertical direction of the panoramic image; and
  when the included angle is smaller than a fourth preset threshold, determining the number of target points in the set of target points other than the two target points that are at distances less than the first preset threshold from the reference plane.

8. The method according to claim 1, wherein determining the vertical correction matrix based on the equatorial plane and the unit vector of the current vertical direction further comprises:
  determining a normal vector of the equatorial plane;
  determining a target vector based on a cross-multiplication between the normal vector of the equatorial plane and the unit vector of the current vertical direction;
  determining a target angle based on a point-multiplication between the normal vector of the equatorial plane and the unit vector of the current vertical direction; and
  determining the vertical correction matrix based on the target vector and the target angle.

9. A device for vertical correction of a panoramic image, comprising:
  a memory configured to store the panoramic image; and
  a processor configured to:
    extract a set of straight line segments from the panoramic image, wherein an included angle between each straight line segment and a current vertical direction of the panoramic image is less than a preset angle;
    determine a set of target points by mapping the set of straight line segments on a unit sphere of the panoramic image;
    determine an equatorial plane of the unit sphere based on the set of target points and a center of the unit sphere, comprising:
      constructing a first plane based on a pair of target points in the set of target points and the center of the unit sphere; and
      determining the equatorial plane of the unit sphere based on the first plane and a number threshold, the number threshold being compared with a number of target points in the set of target points, and the target points in the set of target points meeting a preset condition associated with the pair of target points corresponding to the first plane;
    determine a vertical correction matrix based on the equatorial plane and a unit vector of the current vertical direction; and
    perform the vertical correction on the panoramic image using the vertical correction matrix.

10. The device according to claim 9, wherein to extract the set of straight line segments from the panoramic image, the processor is further configured to:
  perform pinhole projection on the panoramic image to obtain a plurality of pinhole images; and
  extract a subset of straight line segments from each pinhole image in the plurality of pinhole images, wherein the subsets of straight line segments for the plurality of pinhole images collectively form the set of straight line segments of the panoramic image.

11. The device according to claim 9, wherein to determine the set of target points by mapping the set of straight line segments on the unit sphere of the panoramic image, the processor is further configured to:
   project two endpoints of each straight line segment of the set of straight line segments to form a first projection point and a second projection point on the unit sphere;
   determine a normal vector of a plane formed by the center of the unit sphere, and the first projection point and the second projection point of the straight line segment, the plane comprising the first plane;
   normalize the normal vector of the plane to intersect with a spherical surface of the unit sphere; and
   obtain the set of target points based on the normalized normal vector and the target point of each straight line segment.

12. The device according to claim 9, wherein to determine the equatorial plane of the unit sphere based on the set of target points and the center of the unit sphere, the processor is further configured to:
   select, according to a preset manner, a plurality of pairs of target points from the set of target points, each pair comprising two target points, wherein any two pairs differ in at least one target point, the plurality of pairs of target points as selected comprising the pair of target points;
   for each pair of target points of the plurality of pairs of target points as selected, construct a reference plane based on the two target points and the center of the unit sphere, and determine a number of target points in the set of target points other than the two target points that are at distances less than a first preset threshold from the reference plane, the reference plane comprising the first plane; and
   determine, among the reference planes corresponding to the plurality of pairs of target points, the reference plane with a largest number of target points as the equatorial plane.

13. The device according to claim 9, wherein to determine the equatorial plane of the unit sphere based on the set of target points and the center of the unit sphere, the processor is further configured to:
   select, according to a preset manner, two target points from the set of target points, the two target points as selected being the pair of target points;
   construct a reference plane based on the two target points and the center of the unit sphere, the reference plane being the first plane;
   determine a number of target points in the set of target points other than the two target points that are at distances less than a first preset threshold from the reference plane; and
   determine the reference plane as the equatorial plane when the number is greater than a second preset threshold.

14. The device according to claim 12, wherein to determine the number of target points in the set of target points other than the two target points that are at distances less than the first preset threshold from the reference plane, the processor is further configured to:
   determine an included angle between a normal vector of the reference plane and the unit vector of the current vertical direction of the panoramic image; and
   when the included angle is smaller than a third preset threshold, determine the number of target points in the set of target points other than the two target points that are at distances less than the first preset threshold from the reference plane.

15. The device according to claim 13, wherein to determine the number of target points in the set of target points other than the two target points that are at distances less than the first preset threshold from the reference plane, the processor is further configured to:
   determine an included angle between a normal vector of the reference plane and the unit vector of the current vertical direction of the panoramic image; and
   when the included angle is smaller than a fourth preset threshold, determine the number of target points in the set of target points other than the two target points that are at distances less than the first preset threshold from the reference plane.

16. The device according to claim 9, wherein to determine the vertical correction matrix based on the equatorial plane and the unit vector of the current vertical direction, the processor is further configured to:
   determine a normal vector of the equatorial plane;
   determine a target vector based on a cross-multiplication between the normal vector of the equatorial plane and the unit vector of the current vertical direction;
   determine a target angle based on a point-multiplication between the normal vector of the equatorial plane and the unit vector of the current vertical direction; and
   determine the vertical correction matrix based on the target vector and the target angle.

17. An electronic apparatus, comprising:
   a memory, configured to store a computer program; and
   a processor, configured to execute the computer program stored in the memory, and when the computer program is executed, implement a method according to claim 1.

18. A non-transitory computer-readable storage medium having a computer program stored thereon, wherein the computer program, when the computer program is executed by a processor, causes the processor to perform a method for vertical correction of a panoramic image, comprising:
   extracting a set of straight line segments from the panoramic image, wherein an included angle between each straight line segment and a current vertical direction of the panoramic image is less than a preset angle;
   determining a set of target points by mapping the set of straight line segments on a unit sphere of the panoramic image;
   determining an equatorial plane of the unit sphere based on the set of target points and a center of the unit sphere, comprising:
      constructing a first plane based on a pair of target points in the set of target points and the center of the unit sphere; and
      determining the equatorial plane of the unit sphere based on the first plane and a number threshold, the number threshold being compared with a number of target points in the set of target points, and the target points in the set of target points meeting a preset condition associated with the pair of target points corresponding to the first plane;
   determining a vertical correction matrix based on the equatorial plane and a unit vector of the current vertical direction; and
   performing the vertical correction on the panoramic image using the vertical correction matrix.

* * * * *